Dec. 14, 1926.　　　　　　　A. SILVENE　　　　　　　1,611,083
AIR BRAKE
Filed June 17, 1926　　　　2 Sheets-Sheet 1
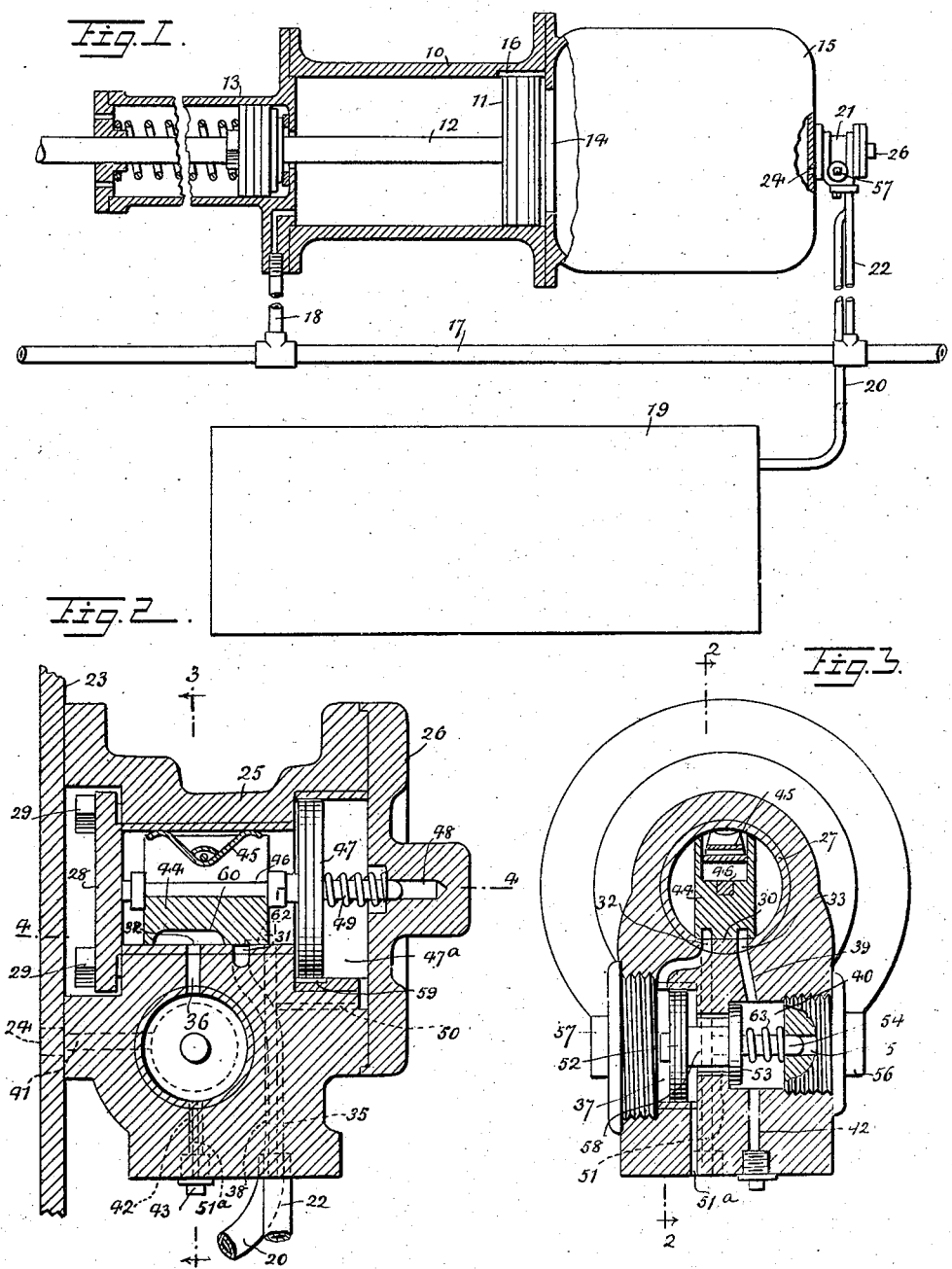

Dec. 14, 1926.

A. SILVENE

AIR BRAKE

Filed June 17, 1926

WITNESSES
H. T. Walker
Robert J. Hielmzer

INVENTOR
Anthony Silvene
BY Munn & Co
ATTORNEYS

Patented Dec. 14, 1926.

1,611,083

UNITED STATES PATENT OFFICE.

ANTHONY SILVENE, OF VICTORIA, BRITISH COLUMBIA, CANADA.

AIR BRAKE.

Application filed June 17, 1926. Serial No. 116,657.

This invention relates to an air brake mechanism and has particular reference to a control valve whereby the use of the triple valve ordinarily employed is eliminated and the operation of the system is entirely under the control of the engineer in the cab.

An object of the invention is to provide a valve under the control of the engineer which will permit pressure in the auxiliary reservoir to be relieved when the brakes are to be released so as to insure a quicker release.

A further object is to provide independent means for charging the supplementary reservoir and to control the use of such charge.

This invention is an improvement on my prior United States patent entitled Automatic air brake #1,514,995 patented November 11th, 1924.

The system under which this valve operates is of that class wherein air under pressure is normally maintained in the train pipe and on both sides of the piston of the brake cylinder and in the auxiliary reservoir of each vehicle of the train and the brake is applied by a reduction of pressure in the train pipe and in the space of the cylinder on one side of the piston whereby the air on the other side of the piston, which is in communication with the auxiliary reservoir which extends to move the piston outward and apply the brakes.

The invention is illustrated in the drawings, of which—

Figure 1 is a side elevation partly in section showing the brake cylinder with its piston, the auxiliary reservoir, the control valve and the supplementary reservoir;

Figure 2 is a longitudinal vertical section through the control valve taken on the lines 2—2 of Figures 3 and 4;

Figure 3 is a section taken on the line 3—3 of Figure 2 looking in the direction of the arrows;

Figure 4:
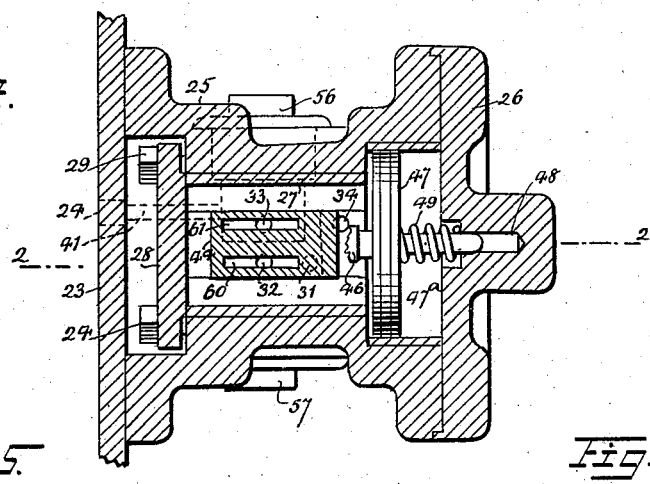
Figure 4 is a horizontal section taken on the line 4—4 of Figure 2.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention concerns a combination which includes a brake cylinder having a piston therein. The cylinder on one side of the piston communicates with the train pipe and on the other side of the piston communicates with an auxiliary reservoir. Fastened to the auxiliary reservoir is a control valve which in one position of its parts is adapted to permit a predetermined release of air from the reservoir through the valve into the atmosphere. When the brake piston is in its extreme open position air from the train pipe can pass around the piston into the auxiliary reservoir to charge the same. Connected to the control valve is a supplementary reservoir which in a certain position of the parts of the valve will be charged from the train pipe and in another position of the valve will be connected in series with the auxiliary reservoir to insure a quick, strong and positive application of the brakes.

The control valve in general comprises a slide valve connected to a piston which operates it. This piston is connected with the train pipe so that air pressure or lack of air pressure in the train pipe causes the piston to move one way or the other and consequently moves the valve. The valve controls a series of ports which lead to the supplementary reservoir, to the train pipe and to an auxiliary valve and piston which control the flow of air from the auxiliary reservoir.

In the preferred form of the invention as shown in Figure 1, I provide a brake cylinder 10 having a piston 11 therein and a piston rod 12 extending forward through a similar cylinder 13 to the brakes, not shown. The opposite end of the cylinder 10 is open as at 14 and connected with an auxiliary reservoir 15. This end of the cylinder 10 is grooved as at 16 to permit air from the train pipe 17 to pass through the connecting pipe 18 into the cylinder and around the piston 11 into the auxiliary reservoir 15 to charge the same. I also show supplementary reservoir 19 connected by a pipe 20 to control valve 21. The train pipe 17 is also connected to this control valve by a pipe 22.

In Figure 2 I show a section of the control valve showing it in position against the rear wall 23 of the auxiliary reservoir 10, a port 24 (see Figure 1) connected with the valve in a manner to be hereinafter described. This valve comprises a body portion 25 with a removable head 26. The body portion is provided with a chamber in which is seated a valve cylinder 27 held in place by a head 28, secured to the body portion by bolts 29. The bottom of this cylinder is flattened as at 30 and is provided with ports 31, 32, 33 and 34. The port 31 is connected with a passage 35 leading to the pipe 22 connected with train pipe 17. The port 32 connects with a passage 36 in the body portion leading to a cylinder 37 also disposed in the body portion. The port 34 connects with a passage 38 in the body portion leading to pipe 20 connected to the supplementary reservoir 19. The port 33 connects with a passage 39 in the body portion leading to a chamber 40 in the body portion. With this chamber 40, a passage 41 in the body portion, leading to the port 24 connecting with the auxiliary reservoir 15, is connected.

Another passage 42 in the body portion connects the bottom of the valve with this chamber 40, and this passage is normally closed by a plug 43 but can be employed in a manner hereinafter to be described. Within the valve cylinder 27 a valve 44 is adapted to slide, this valve being held on the bottom of the sleeve 27 by means of the spring 45. This valve is mounted on a stem 46 to which a piston 47 is connected, this stem extending beyond the piston into a bore 48 in the cover plate 46. A spring 49 is a compression spring which tends to hold the piston 47 and slide valve 44 in the left hand position within the chamber in which the piston 47 slides. The spring 49 is just strong enough to hold the piston and slide valve 44 to the left. In any event the piston and slide valve will be so held, because a normal air pressure of 90 to 110 pounds usually carried and maintained would hold the piston in this position. This piston therefore, is the main valve controlling piston. The right hand side of the piston 47 is connected by means of a small passage 50 to the passage 35 leading to the pipe 22 and which is connected with the train line 17. In the lower part of the body portion I dispose the chambers 37 and 40 previously mentioned. These are connected by small passages such as 51. In the chamber 37 an auxiliary control piston 52 is adapted to slide. In the chamber 40 a valve 53 is adapted to move, the valve having a stem 54 extending into a bore 55 formed in a threaded cap 56 closing the end of the chamber 40. A threaded cap 57 closes the end of chamber 37. The piston 52 and the valve 53 are connected by a stem 58. It will be noticed that the chamber 47$^a$, in which the piston 47 slides, is provided with a groove 59 so that in the left hand position of the piston, as shown in Figure 2, any air pressure can reach both sides of the piston. The bottom of the valve 44 has two main cut-out portions 60 and 61 and an undercut groove 62 at the right hand end thereof, as shown in Figure 2. The valve 53 is adapted to be held against this seat by means of a compression spring 63.

In the operation of the device we will assume that the engineer moves his brake valve to apply full pressure to the train pipe 17. This pressure will flow through the pipe 18 into a brake cylinder, moving the brake piston 11 to the right to release the brakes. When the piston is in its right hand position, shown in Figure 1, the air will flow through the by-paths 16 and charge the auxiliary reservoir 15. At the same time the pressure will flow through pipe 22, passage 35, passage 50, into chamber 47$^a$ and move the piston 47 to the extreme left to the position shown in Figure 2. Air will also pass into the supplementary reservoir 19, to fill the same by way of the passages 35, 50, 59, and port 34.

By way of illustration, we will suppose the engineer makes an easy reduction of the air passage in the train pipe 17. This reduction of pressure from the normal releases pressure as described. When the parts are in the position shown in Figure 2 they will cause the piston 47 to move to the right against the action of spring 49 and assisted by the air pressure in the supplementary reservoir until it assumes the position shown in Figure 5. In this position the ports 31 and 32 are connected, thus connecting passages 35 and 36. This will cause a reduction of pressure on the left side of piston 52 to tend to hold the valve 53 even more tightly on its seat. At the same time that the pressure in the train pipe is reduced the pressure will be reduced on the left side of brake piston 11 permitting the air in the auxiliary reservoir 15 to force the piston 11 to the left side as seen in Figure 1 and produce an easy application of the brakes.

Figure 5:
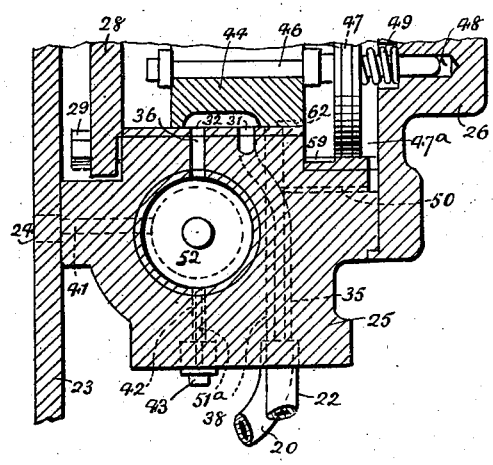
Figure 5 is a partial section similar to Figure 2 showing the parts in the positions they assume during average applications of the brakes.

After the brakes have been applied thus easily and it is desired to release the brakes with the parts in the position shown in Figure 5 the engineer increases the air pressure which flows through passage 35, through ports 31 and 32, passage 36 to the left hand face of piston 52 shown in Figure 3, causing the piston to move slightly to the right. This will tend to lift the auxiliary control valve 53 off its seat and will allow air to flow to some slight extent from the auxiliary reservoir through port 24, passage 41 into chamber 40, around the valve 53, through passages 56 to the right hand side of piston 52 in chamber 37 and discharge through a passage 51ª into the atmosphere, thus permitting the brake cylinder piston to move back to its normal position shown in Figure 1 more quickly.

Figure 6:
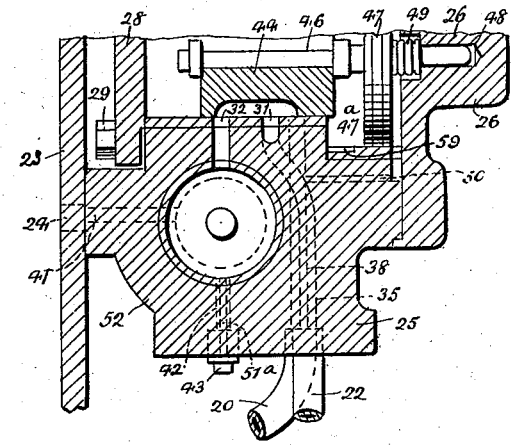
Figure 6 is a similar section showing the parts in the position they assume when a strong application of the brakes is being made.
Figure 8:
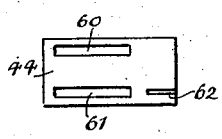
Figure 8 is an inverted plan view of the slide valve.
Figure 7:
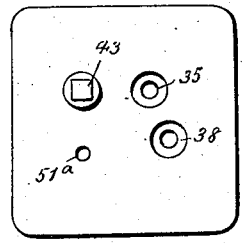
Figure 7 is a bottom plan view of the valve showing the pipe connections and the auxiliary air discharge port.

With the parts shown in the position illustrated in Figures 2, 3 and 4, we will assume that the engineer wishes to make a very quick and strong application of the brakes, in which case he causes a very heavy reduction of air in the train pipe. This will reduce the air pressure to the right piston 47 which will move to the extreme right hand position shown in Figure 6. In this position the train pipe, port 31 and the auxiliary cylinder port 32 are connected, thus insuring the usual piston seating of the valve 53. At the same time ports 33 and 34 are connected. This permits the connection of pipe 20 through the supplementary reservoir 19 with the passage 39 leading to the chamber 40, so that the supplementary air will pass from the chamber 40 through the passage 41, port 24, into the auxiliary reservoir 15 to augment the auxiliary air pressure. To release from this position, the action requires the engineer to bring the train pipe pressure back to normal, whereupon the parts are moved back to the position shown in Figure 2. As a too rapid lifting of piston 47 and slide valve 44 would close port 34 before it had time to allow the pressure to operate the piston 52, the passage 50 is made of small dimensions.

The groove 62 is cut in the slide valve 44 so that supplementary air is, during average applications of the brakes, operating on top of piston 47 to prevent a too rapid movement of the same to normal position. The plug 43 shown in the passage 42 connecting with the chamber 40 is placed in this position in case a valve were disposed in any other relation to the wall of the auxiliary reservoir than as shown. If this change were made, the plug could be taken out and a pipe connected to this passage and the plug screwed into the passage 41, which is now shown as connected to the auxiliary reservoir.

What I claim is:

1. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, means in the valve operated when the air is restored to normal in the train pipe, after a reduction whereby the air in the auxiliary reservoir is allowed to escape to a slight extent through the control valve into the atmosphere for the purpose of assisting in restoring brake pistons to normal position more rapidly.

2. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, means in the valve operated when the air is restored to normal in the train pipe after a reduction whereby the air in the auxiliary reservoir is allowed to escape to a slight extent through the control valve into the atmosphere for the purpose of assisting in restoring brake pistons to normal position more rapidly, and means in the valve operated when the air in the train pipe is established at a normal value to charge the supplementary reservoir through the control valve from the train pipe.

3. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, and means in the valve operated when the air is reduced in the train pipe to a maximum extent whereby the supplementary reservoir and the auxiliary reservoir are connected in series for the purpose of augmenting the action of the air on the brake piston in such an emergency application of the brakes.

4. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, means in the valve operated when the air in the train pipe is established at a normal value to charge the supplementary reservoir through the control valve from the train pipe, and means in the valve operated when the air is reduced in the train pipe to a maximum extent whereby the supplementary reservoir and the auxiliary reservoir are connected in series for the purpose of augmenting the action of the air on the brake piston in such an emergency application of the brakes.

5. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, means in the valve operated when the air is restored to normal in the train pipe, after a reduction whereby the air in the auxiliary reservoir is allowed to escape to a slight extent through the control valve into the atmosphere for the purpose of assisting in restoring brake pistons to normal position more rapidly, and means in the valve operated when the air is reduced in the train pipe to a maximum extent whereby the supplementary reservoir and the auxiliary reservoir are connected in series for the purpose of augmenting the action of the air on the brake piston in such an emergency application of the brakes.

6. In combination, an air brake cylinder having a piston therein, an auxiliary reservoir connected to said cylinder, a control valve connected to the auxiliary reservoir, a supplementary reservoir connected to the control valve, a train pipe connected to the brake cylinder and to the control valve, means in the valve operated when the air is restored to normal in the train pipe after a reduction whereby the air in the auxiliary reservoir is allowed to escape to a slight extent through the control valve into the atmosphere for the purpose of assisting in restoring brake pistons to normal position more rapidly, means in the valve operated when the air in the train pipe is established at a normal value to charge the supplementary reservoir through the control valve from the train pipe, and means in the valve operated when the air is reduced in the train pipe to a maximum extent whereby the supplementary reservoir and the auxiliary reservoir are connected in series for the purpose of augmenting the action of the air on the brake piston in such an emergency application of the brakes.

ANTHONY SILVENE.